Figure 1:
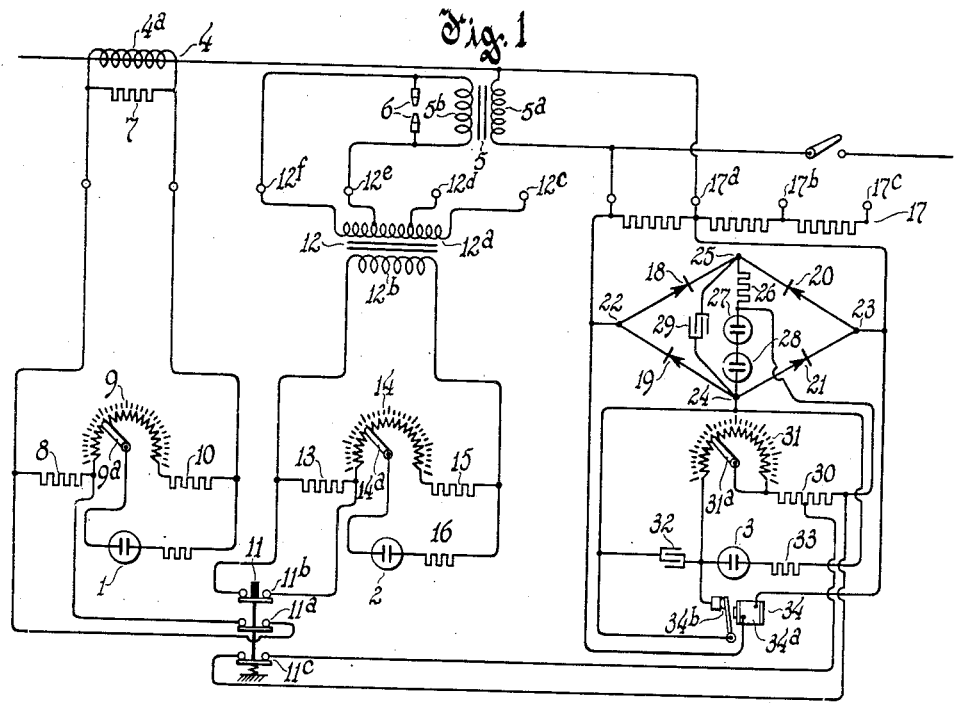

March 7, 1939.  C. STANSBURY ET AL  2,149,558
MEASURING INSTRUMENT
Filed Jan. 2, 1935

Inventors
Carroll Stansbury
Arthur Simon
By Frank A Hubbard
Attorney

Patented Mar. 7, 1939

2,149,558

UNITED STATES PATENT OFFICE 2,149,558

MEASURING INSTRUMENT

Carroll Stansbury, Wauwatosa, and Arthur Simon, Milwaukee, Wis., assignors to Cutler-Hammer, Inc., Milwaukee, Wis., a corporation of Delaware Application January 2, 1935, Serial No. 182

7 Claims. (Cl. 175—183)

This invention relates to measuring instruments and particularly to an instrument for measurement of the characteristic values of a flow of electrical energy of relatively short duration.

The invention is particularly advantageous for the measurement of the characteristic values of alternating current electrical energy supplied in welding processes and especially in spot and seam welding where a current of accurately adjusted magnitude and potential has to be supplied for a very short but accurate period of time.

An object of the invention is to provide an instrument for measuring simultaneously the current, voltage and the time of duration of a transient supply of electrical energy.

Another object is to provide instantaneously indicating measuring instruments affording simultaneous measurements of current, voltage and duration of supply of electrical energies.

Another object is to provide a visual indication of the quantities involved in the measurement of the energy available in an electrical power supply, such indication not being possible with conventional pointer instruments.

Another object is to provide means to obtain readings of the quantity involved and to afford a check on repeated supply of electrical energy, by a simple and easy manipulation of the apparatus employed.

Another object is to provide for individual and distinct readings or indications of the quantities involved for each of a series of successive energy impulses.

Another object is to provide apparatus adapted for measuring a wide range of currents, voltages and time, the range for each quantity being adjustable independently of the range for another quantity.

Another object is to provide an instrument of the aforementioned type which is compact in form and easily portable and which can quickly be connected in the circuit to be tested and the operation of which requires only simple manipulations.

The conventional types of pointer instruments are wholly unsuited for such measurements as current and voltage, where the application of power is of very short duration, as is the case in spot-welding, because the inertia of the moving element of the instrument is such as to prevent it from reaching an equilibrium before the flow of energy has stopped. Furthermore the duration of the energy supply period cannot be readily established with the usually available instruments. The present invention involves the use of light to indicate whether the magnitude of the current and voltage of the welding energy is equal to the desired value and whether the time of application equals the desired time interval. More particularly it involves the use of light from glow tubes which are responsive instantaneously to electrical variations and which are employed in ascertaining the several values to be measured, said tubes furthermore being so employed that the user may observe all or a number thereof at the same instant and at any instant be conscious of the flashings thereof for interpretation of such flashings collectively.

According to the present invention a glow tube is connected into the circuit in such a manner that the operating characteristic to be checked causes a voltage to be impressed on the tube which is just equal to the critical voltage at which the tube lights. The voltage impressed on the tube is regulated by means of an adjustable resistor and the position of the movable contact of the resistor is a measure of the value of the characteristic. The accompanying drawing illustrates diagrammatically two embodiments of the invention.

Figure 2:
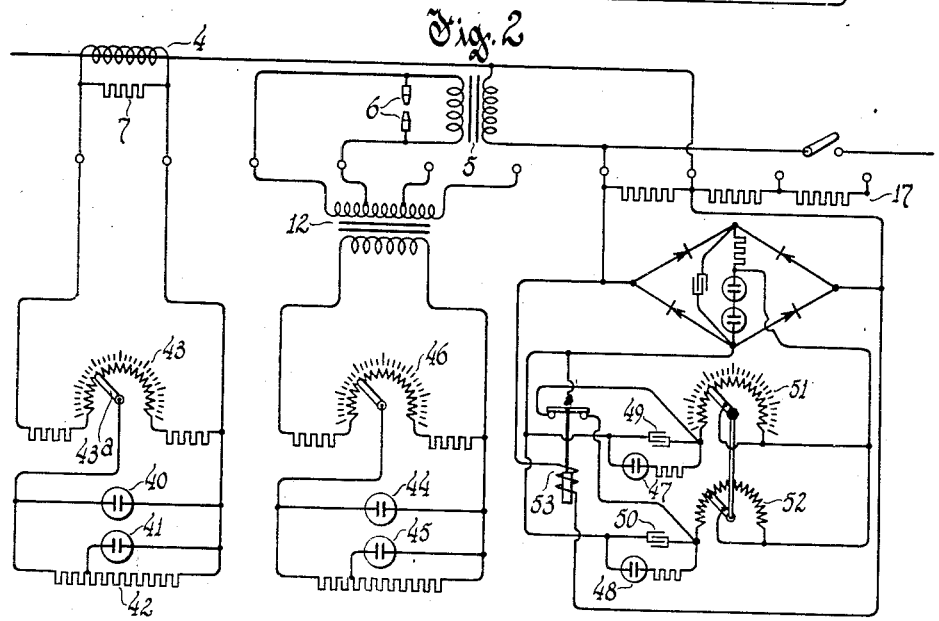

Referring to the drawing Figure 1 illustrates a system in which indications of the voltage, current and time of the welding impulses are obtained by depressing a pushbutton which controls the apparatus as will be explained; while Fig. 2 shows a modification of Fig. 1 wherein indications are obtained automatically upon the occurrence of each welding impulse.

Referring specifically to Fig. 1, the numerals 1, 2 and 3 designate glow tubes which light up when a definite voltage is impressed upon them. The three tubes serve to indicate the primary current flowing in a welding circuit, the voltage across the welding electrodes and the duration of the welding current impulse respectively. Tube 1 is connected to the secondary winding $4^a$ of a current transformer 4 the primary winding of which is connected in series with a primary winding $5^a$ of a welding transformer 5, the secondary winding $5^b$ of the latter being connected across the welding jaws 6. Across the secondary winding $4^a$ of the current transformer 4 is connected a resistor 7. A second circuit across the secondary winding $4^a$ includes in series a resistor 8, a variable resistor or voltage divider 9 and a fixed resistor 10. Between one terminal and an adjustable contact attached to a pointer $9^a$ of the voltage divider 9 is connected the glow tube 1. Thus if a current flows in the welding circuit, a voltage is induced in the secondary winding 4ª of the current transformer 4. A portion of this voltage is impressed upon the glow tube 1. The ratio of the voltage impressed upon tube 1 to the voltage induced in the secondary winding 4ª or to the current flowing in the primary welding circuit depends upon the position of the movable contact or pointer 9ª. If the latter is adjusted so that on a current impulse the voltage impressed upon the tube 1 is just sufficient to cause it to flash, the position of said pointer serves as an indication of the magnitude of the current. By associating with the pointer a suitably calibrated scale, the value of the current may be read directly on said scale.

The apparatus also includes a triple contact pushbutton 11 having normally closed contacts 11ª, 11ᵇ and 11ᶜ. The contacts 11ª normally short circuit the resistor 8 in series with the voltage divider, so that when the pushbutton is released, a relatively high voltage is impressed upon the tube 1, whereas when the contact 11ª is open upon depression of the pushbutton the voltage impressed on tube 1 is somewhat smaller. By proper proportioning of the resistor 8 the ratio between the two voltages impressed upon the tube 1 for a given welding current may be regulated so that with the pointer in a certain position and with the resistor 8 in circuit the tube 1 will be dark, whereas with said resistor 8 short circuited the tube 1 will light up. It will therefore only be necessary for the user to alternately depress and release the pushbutton and adjust the pointer so that in the first case the tube is dark, while in the latter case it flashes. Thus I provide easy means for guiding the user in making proper adjustment of the movable pointer 9ª and for determining accurately and within the required limits, the welding current.

The tube 2 is arranged to indicate the voltage across the welding jaws. In order to provide for measurement of the wide range of welding voltages I provide an adjustable voltage transformer 12 having intermediate taps on its primary winding 12ª which taps are connected respectively to the terminals 12ᶜ, 12ᵈ and 12ᵉ while the fixed end of such winding is connected to the terminal 12ᶠ, the latter being adapted to be permanently connected to one of the welding jaws while one of the intermediate terminals of the primary winding may be connected to the other jaw. Between the terminals of the secondary winding 12ᵇ of the variable ratio transformer 12 is connected a circuit including a fixed resistor 13, a voltage divider 14 and a fixed resistor 15. The voltage divider 14 is constructed identically with that described in connection with the tube 1 and the fixed resistors 13 and 15 correspond to the fixed resistors 8 and 10 respectively of tube 1. The tube 2 is connected in series with a fixed resistor 16 between one terminal of the secondary winding 12ᵇ and the movable pointer 14ª of the voltage divider 14. The contacts 11ᵇ of the pushbutton 11 serve to short circuit the fixed resistor 13. Thus, by operating the pushbutton 11 and the adjustable arm 14ª of the voltage divider 14 it is possible to adjust the voltage impressed upon the tube 2 so that the position of the pointer 14ª is an indication of the voltage impressed upon the welding jaws as aforedescribed in connection with the measurement of the current by means of the tube 1.

The tube 3 serves to measure the time during which the welding current is applied to the welding jaws 6. As is well known, if a condenser is charged from a source of unidirectional current through a resistance the instantaneous voltage of the condenser varies with the charging time, or in other words, the instantaneous voltage at the terminals of the condenser is a measure of the time of charging, and the time, which has to elapse until the condenser reaches a given voltage, is a measure of the applied voltage. If, therefore, the condenser is charged for a given period from a constant voltage supply through a variable resistor and the resistance is varied so that the voltage of the condenser just reaches a certain value at the end of the charging period, the adjustment of the resistor is an indication of the time during which the constant voltage was applied. This principle is made use of in the control of the tube 3, whose control resistor is adjusted in such a manner that the voltage impressed upon the tube is just at the critical value and the tube will either light up or be dark, depending upon whether the pushbutton contacts 11ᶜ are open or closed.

The elements which comprise the mechanism for measuring the duration of the welding period include a voltage divider 17 which is arranged with taps 17ª, 17ᵇ and 17ᶜ for connection to different standard line voltages such as 220, 440 and 550 volts. The voltage which is impressed upon the time-measuring circuit is taken from one of the taps, so that it is always constant, for instance, 220 volts. If the line voltage is of a higher value, the line is connected to a higher tap of the voltage divider 17.

Between two fixed taps of the voltage divider are connected in a well known manner in a bridge circuit, four rectifying elements 18, 19, 20 and 21. If an alternating current is impressed between the points 22 and 23 of the rectifying bridge, a unidirectional voltage exists between the points 24 and 25. Connected between these points in series are a resistor 26 and two glow tubes 27 and 28, the purpose of the glow tubes in connection with the resistor being to assure a constant voltage between the extreme terminals 24 and 25 of the two glow tubes irrespective of slight variations in the line voltage. A condenser 29 is also connected between points 24 and 25 of the rectifier bridge to smooth out the ripples in the direct current voltage in a well known manner. Connected across the extreme terminals of the two glow tubes 27 and 28 in series are a fixed resistor 30 and a variable resistor 31 and the timing condenser 32. By adjusting the variable resistor 31 the voltage which the condenser 32 attains in a given time interval may be varied, and therefore the position of the movable pointer 31ª of the variable resistor 31 may be used as an indication of the length of time which is required to charge the condenser 32 to a given voltage.

In order to determine whether the condenser has reached a certain voltage, glow tube 3 is connected across the condenser terminals in series with a resistor 33. A relay 34 has an operating winding 34ª which is connected across the primary winding 5ª of the welding transformer and a normally closed contact 34ᵇ which is connected across the terminals of the condenser 32, so that when the supply circuit is deenergized the condenser is short-circuited and therefore its charge is neutralized. If the relay 34 is energized when the welding circuit is energized, the switch contacts 34ᵇ are opened so that now the condenser 32 receives a charge due to the voltage across the extreme terminals of the glow tubes 27 and 28. By adjusting the movable pointer 31ᵃ of the resistor 31 the condenser 32 can be charged during the time during which the welding circuit is energized to a value just sufficient to cause lighting of the glow tube 3.

The resistor 30 is provided with an intermediate tap and the contacts 11ᶜ of the pushbutton 11 are adapted to short circuit one section of said resistor. When this section is short circuited a somewhat higher voltage is impressed upon the condenser and therefore the voltage impressed on the glow tube 3 is also higher so that it will light up, whereas, when the pushbutton 11 is depressed and the entire resistor 30 is inserted into the charging circuit of the condenser the latter does not reach a voltage at which the glow tube 3 lights up. By proper adjustment in the manner aforedescribed in connection with the measurement of the voltage and current of the circuit it is thus possible to adjust the pointer of the variable resistor 31 in such a manner that its calibration indicates the duration of the welding current.

Figure 2 shows a modification of the system aforedescribed. In this case two glow tubes take the place of each of the single glow tubes in Fig. 1. The pushbutton 11 of Fig. 1 with its contacts has been omitted. The system in Fig. 2 is adapted to indicate continuously the values of time, current and voltage, it being merely required to adjust the respective variable resistors.

Referring particularly to the circuit for measuring the current, it will be noted that two glow tubes 40 and 41 are employed. The tube 40 is connected across the variable resistor circuit in a manner aforedescribed in connection with Fig. 1, while the tube 41 is connected in parallel with part of a voltage divider 42 which in its entirety is connected in parallel with the tube 40. It will thus be seen that the adjustable resistor may be set so that the voltage impressed upon the tube 40 is just sufficient to cause it to light, while the tube 41 will remain dark. The actual value of the current in the welding circuit therefore corresponds to the mean of the two values of the voltages impressed upon the glow tubes and the ratio of the voltage impressed upon the two tubes may be adjusted as closely as desired by proper adjustment of the intermediate tap of the voltage divider 42. The position of the pointer 43ᵃ of the variable resistor 43, therefore, indicates continuously the current in the system provided that the arm is always adjusted in such a manner that as aforedescribed the tube 40 lights up while the tube 41 remains dark.

In a similar manner the voltage of the circuit is indicated by the two glow tubes 44 and 45, the detail connection and operation of which is obvious from the foregoing explanation and that given in connection with Fig. 1.

The connection of the glow tubes 47 and 48 to measure the time in the circuit of Fig. 2 is somewhat different from that of the tubes for measuring current and voltage. As has been explained in connection with Fig. 1, the time during which the welding current flows is measured by charging a condenser to the critical voltage of the glow tube and regulating the charging current by a resistor whose calibration scale reads in terms of charging time. While the connections as used for measuring voltage, suitably modified might be used to measure the time, the circuit illustrated in Fig. 2 is preferred, it being understood that similar connections may also be used to measure the other characteristic quantities of the welding energy.

In the connection for measuring time illustrated in Fig. 2, the glow tubes 47 and 48 are respectively connected across condensers 49 and 50, these having the same capacity. Condenser 49 is connected in series with a variable resistor 51 and condenser 50 with a variable resistor 52 across the glow tubes 27 and 28 as described in connection with Fig. 1. The contact arms of resistances 51 and 52 are coupled together and are provided with a scale calibrated in time, a relay 53 providing for discharging the condensers 49 and 50 in the manner aforedescribed. If the contact arms of resistors 51 and 52 are so adjusted with respect to each other that the voltage impressed upon condenser 49 is slightly lower than the voltage of condenser 50, the contact arms may be jointly so adjusted that the tube 47 does not glow, while tube 48 glows at the end of the welding period and hence the scale of the resistors indicates directly the time of current flow.

As all of the indications are dependent upon light signals of short duration, which can readily be observed and recorded by the mind, this system of measuring provides a simple and accurate, readily interpreted method of measuring welding phenomena.

It will of course be understood that the transformer for measuring the current may be inserted in the secondary welding circuit and that other quantities of the electric energy supply may be measured by suitable coordination between measuring circuits similar to those described herein and the circuit which conducts the energy whose characteristic is to be determined.

What we claim as new and desire to secure by Letters Patent is:

1. A device for measuring a characteristic quantity of an electrical energy impulse of short duration from a source of energy supply comprising a measuring circuit including a glow discharge tube which emits light upon the application of a given voltage thereto, means to impress a voltage which is a function of said quantity upon said circuit in response to an impulse and means to impress a portion of said voltage which differs slightly from said emission voltage, including pushbutton means to modify said last named voltage portion and further including means adapted to indicate the ratio between said impressed voltage and the mean value of said modified voltage and said portion of said voltage, said indicating means being provided with a calibration to indicate directly the magnitude of said quantity.

2. A device for simultaneously measuring several characteristic quantities of an electrical energy impulse of short duration comprising a separate measuring circuit for each of said quantities, each of said circuits including a glow discharge tube which emits light upon the application of a given voltage thereto, said tubes being arranged in close proximity to each other, means to impress in response to an impulse, voltages which are functions of said quantities upon said several circuits respectively and means to impress upon said several tubes portions of said respective voltages which are slightly lower and other portions which are slightly higher than said emission voltages of said tubes, the last mentioned means including means to indicate the ratios between said several impressed voltages and the respective mean values of said several voltage portions, said indicating means being provided with a calibration to indicate directly the magnitude of said several respective quantities.

3. A device for simultaneously measuring several characteristic quantities of an electrical energy impulse of short duration comprising a separate measuring circuit for each of said quantities, said circuits including individual glow discharge devices which emit light upon the application of a given voltage thereto, said devices being arranged in close proximity to one another, means to impress voltages which are functions of said quantities upon said several circuits respectively in response to an impulse and means to impress upon said glow discharge devices portions of said respective voltages which are slightly lower and other portions which are slightly higher than said emission voltage of said glow discharge devices, the last means comprising means to indicate the ratios between said several impressed voltages and the respective mean value of said several voltage portions, said indicating means being provided with a calibration to indicate directly the magnitude of said several respective quantities.

4. A device for simultaneously measuring several characteristic quantities of an electrical energy impulse of short duration comprising a separate measuring circuit for each of said quantities, each of said circuits including two similar glow discharge tubes which emit light upon the application of a given voltage thereto, said tubes of said several circuits being arranged in close proximity, means to impress voltages which are functions of said quantities upon said several circuits respectively in response to an impulse and means to impress upon one of the tubes of each circuit a portion of its said voltage slightly lower and upon the other tube a portion of its said voltage slightly higher than said emission voltage of said tubes, the latter means including means to indicate the ratios between said several impressed voltages and the respective mean value of said voltage portions, said indicating means being provided with a calibration to indicate directly the magnitude of said several quantities.

5. A device for simultaneously measuring several characteristic quantities of an electrical energy impulse of short duration comprising a separate measuring circuit for each of said quantities, each of said circuits including a glow discharge tube which emits light upon the application of a given voltage thereto, said tubes being arranged in close proximity to each other, means to impress voltages which are functions of said quantities upon said several circuits respectively in response to an impulse and means to impress upon said several tubes portions of the voltages of their respective measuring circuits differing slightly from their emission voltages, the last mentioned means including push button means to modify said voltage portions and further including means adapted to indicate the ratios between said several impressed voltages and the respective mean value of said several voltage portions, said indicating means being provided with a calibration to indicate directly the magnitude of said several quantities.

6. A device for measuring the duration of an electrical energy impulse, comprising a measuring circuit, including a rectifying circuit connected to the former, a glow discharge tube which emits light upon the application of a given voltage thereto, means to derive a fixed unidirectional voltage from said rectifying circuit, means to impress upon said condenser a portion of said fixed voltage which during the impulse period charges the condenser for attainment of its maximum potential at the end of the impulse period and to impress said potential upon said glow tube, means to adjust said portion of said derived voltage to a value which will cause it when at maximum potential to be substantially equal to the emission voltage of said tube, and means to determine the ratio of said derived voltage and said portion of said fixed voltage.

7. A device for measuring the duration of an electrical energy impulse, comprising a measuring circuit including two glow discharge tubes which emit light upon the application of a given voltage thereto, a condenser connected in circuit with each glow tube, means for deriving a fixed voltage from the impulse, adjustable means to impress upon said condensers portions of said fixed voltage which during the impulse period charge the condensers for attainment of their maximum potentials to the end of the impulse period, and to impress said potentials upon the respective glow tube, means to adjust said portions of said derived voltages to values which will cause the maximum value of one to be slightly in excess and of the other to be slightly below the emission voltage of the respective tube and means to determine the ratio of said derived voltage and said portions of said fixed voltage.

CARROLL STANSBURY.
ARTHUR SIMON.